Oct. 27, 1953

T. L. DIMOND 2,657,272

ELECTRONIC INDUCTION TRANSLATOR

Filed March 3, 1951

2 Sheets-Sheet 1

INVENTOR
T. L. DIMOND
BY J. MacDonald
ATTORNEY

Oct. 27, 1953 T. L. DIMOND 2,657,272

ELECTRONIC INDUCTION TRANSLATOR

Filed March 3, 1951 2 Sheets-Sheet 2

INVENTOR
T. L. DIMOND
BY J. MacDonald
ATTORNEY

Patented Oct. 27, 1953 2,657,272

UNITED STATES PATENT OFFICE 2,657,272

ELECTRONIC INDUCTION TRANSLATOR

Thomas L. Dimond, Rutherford, N. J., assignor to Bell Telephone Laboratories, Incorporated, New York, N. Y., a corporation of New York Application March 3, 1951, Serial No. 213,708

6 Claims. (Cl. 179—18)

Figure 1:
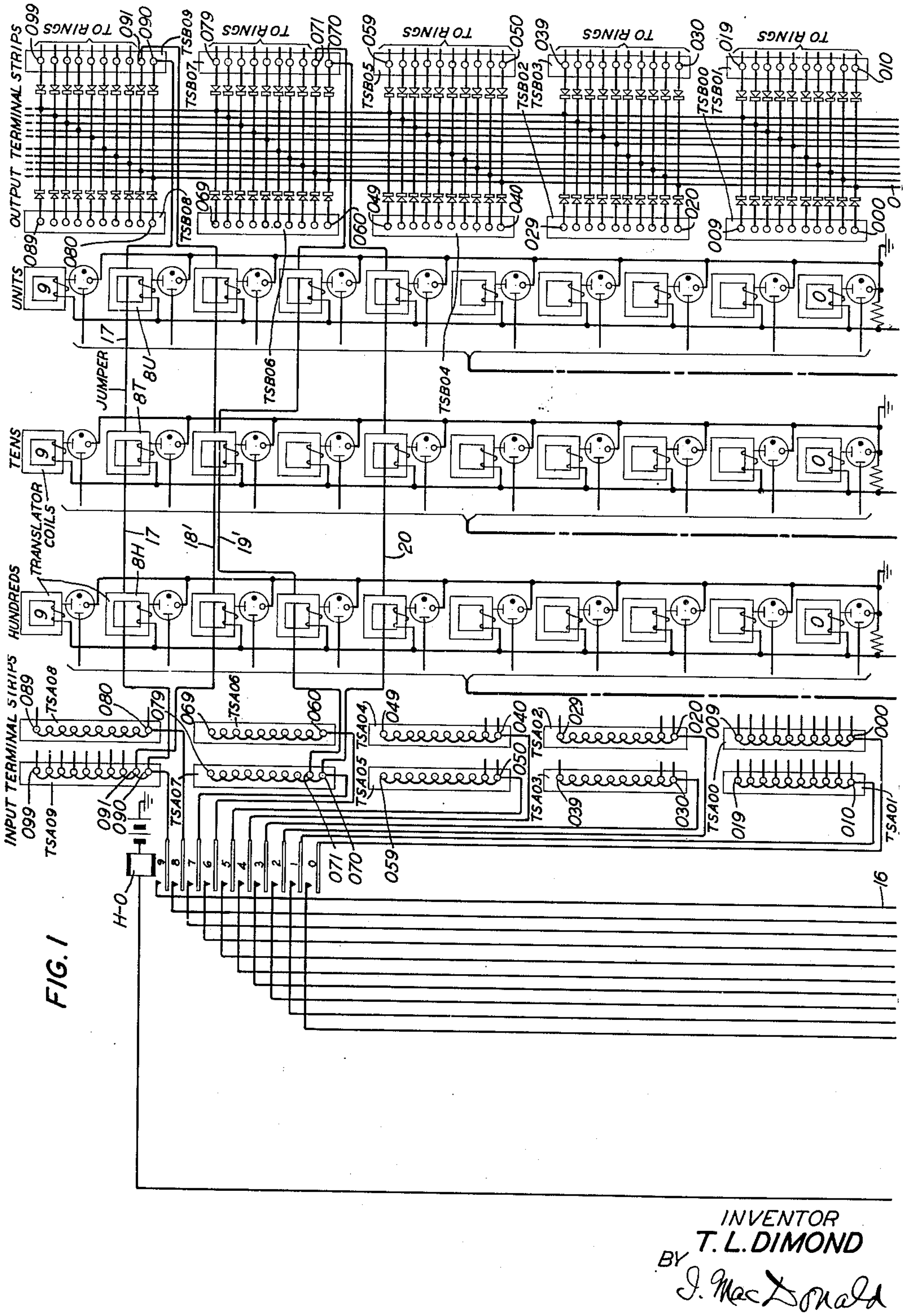

This invention relates to a translating system for translating from one set of digits to another set of previously designated digits. Its chief object is to reduce the number of relay contacts required to effect this translation. Such a translator could be employed in automatic telephone switching systems as a number group translator to translate from subscriber numbers to frame and line location information, or it could be used to translate frame information into subscribers numbers for recording and accounting purposes. It might also be employed to translate route codes into frame and equipment information.

Said invention comprises a novel circuit arrangement which embodies a plurality of coils or magnetic rings, windings individual to said rings, devices responsive to the energization of said windings, jumpers, each threaded through some combination of said rings and which energize said windings when traversed by a changing electric current, a rectifier in the circuit of each jumper, means including said rectifiers for selecting one of said jumpers, and means whereby a source of changing current can be connected to a plurality of said jumpers, said rectifiers being so poled that current of only one polarity from said source can flow through the selected jumper, and thereby activate only the selected one of said jumpers to energize the windings of the rings through which the selected jumper is threaded, and consequently only predetermined ones of said responsive devices being actuated.

In my previous application, Serial No. 160,497, filed May 6, 1950, which issued on October 14, 1952, as Patent 2,614,176, I show and describe an improvement in the number group circuit (translating circuit) of a cross-bar telephone system which translates the telephone directory number of the called subscriber's line to an equipment number which represents the location of the hold magnet of that line upon a line-link frame of such system, the improvement consisting of the use of a "ring" type of translator and switching means by which the translator is made effective. In such a translator there is a conductor or jumper for each directory number associated with the number group. There is also a group of relays whose function it is to select any one of the jumpers in accordance with the directory number and to cause a surge of current to be sent through said jumper. A vital part of this translator is the plurality of groups of coils, each group representing a type of digit and each coil the specific value of the digit. Each coil has associated with it a device, such as a gas-filled tube, to convert the low power current surge into a steady current suitable for operating a relay. An individual coil consists of a closed magnetic core with an output winding thereon. The input winding of the coil consists of a jumper wire which runs through the physical closure of the core, said output winding connected to the control electrode of one of the gas-filled tubes in such a manner that when a voltage of sufficient magnitude is generated across the winding, due to the changing current in a jumper running through it, the tube will be fired. Each jumper is threaded through a combination of coils, which combination is identified with the location of the line equipment on the frames. When a changing current occurs in a jumper, the output windings of the coils through which the jumper is threaded are energized and the corresponding tubes fired. The tubes in turn cause relays in the marker to operate, and the combination of relays thus operated indicates the location of line equipment on the frame.

The terms coil and ring are used interchangeably throughout this description.

The main advantage of the "ring" translator is that only a single jumper needs to be changed when the relationship between a directory number of a line or station and the line equipment number is changed. This reduces considerably the amount of work required to make the changes in line location necessitated by changing traffic conditions.

The present invention is an improvement over the circuit arrangement of said application in that it materially reduces the number of relay contacts required to reach one of 1000 terminals, or any multiple of 1000 terminals, say 10,000 terminals which is the usual number of stations in a fully equipped central office. In the conventional "tree" circuit arrangement 1000 contacts are required to reach any one of 1000 terminals, whereas by virtue of the present invention only 130 contacts are required, exclusive of a few control contacts.

Figure 2:
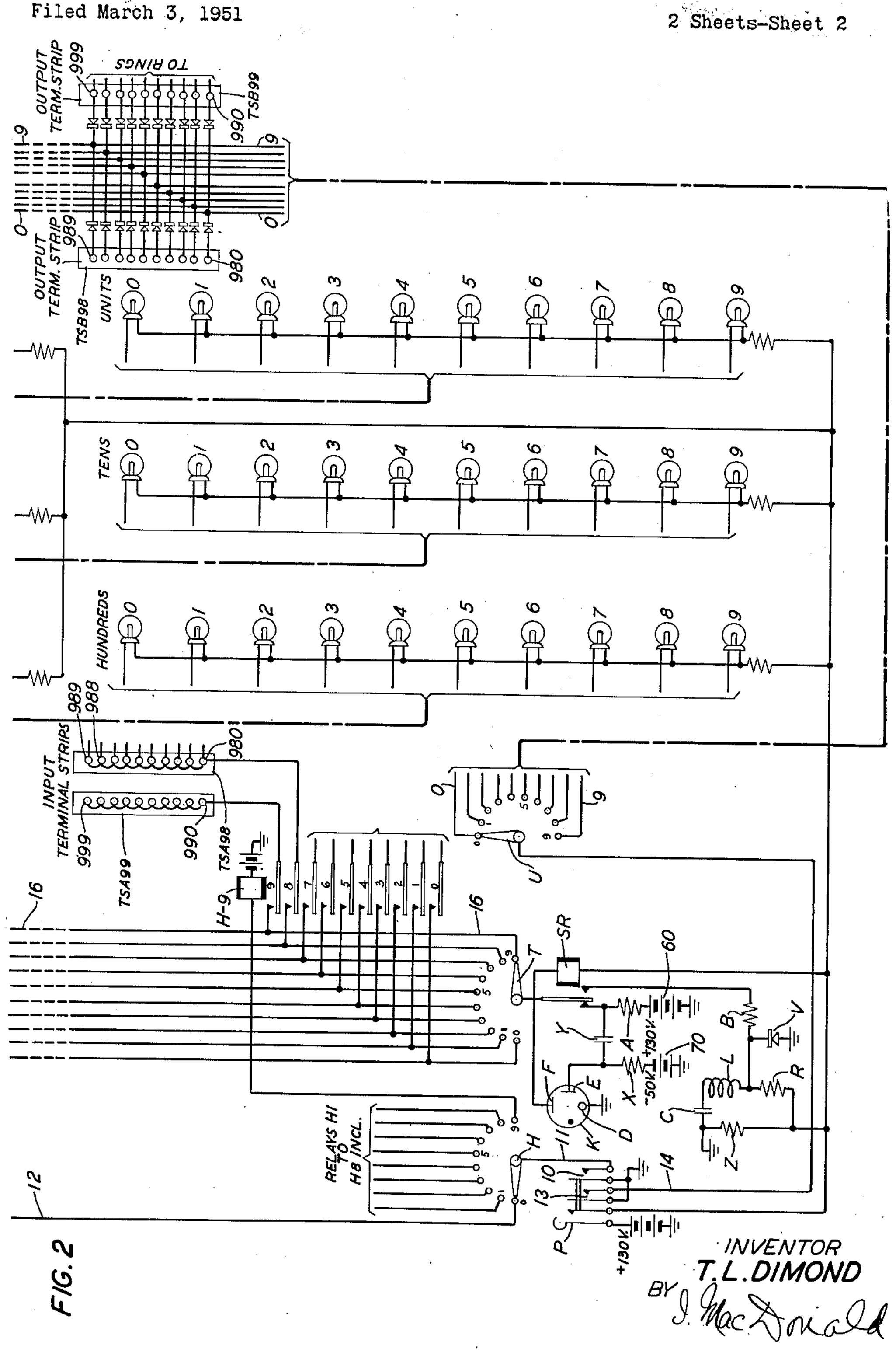

In order to illustrate and explain this invention, Figs. 1 and 2 show in a simple manner elements necessary for translating any one of 1000 three-digit numbers to its corresponding predetermined new combination of digits, and which includes manually operable switch registers and a start key. It should be understood, however, that automatic means could be employed to close the equivalent contacts and that the translated or output information which is indicated on lighted lamps could be registered in some other way such as on relays or gas tubes.

Fig. 1 shows the complete set of coils needed for this example of a three-digit translator with their respective gas tubes, a group of input terminal strips designated TSA00 to TSA09, a group of output terminal strips designated TSB00 to TSB09, with terminals representing the first hundred numbers 000 to 099, one of ten hundreds-block relays H–0 and the rectifiers associated with the output terminals. A sufficient number of jumpers are shown in place to illustrate this description.

Fig. 2, which should be placed below Fig. 1, shows the hundreds, tens and units input register decade switches H, T and U, respectively, the input terminal strips designated TSA98 and TSA99 for the last twenty terminals of the last or ninth hundred numbers of the thousand numbers which shall be considered, the corresponding output terminal strips designated TSB98 and TSB99 along with their rectifiers, the ninth hundreds block relay (H–9), the control circuit and the array of lamps upon which the output translation is displayed. The control circuit consists of the start key P, tube F, relay SR, several resistors, a rectifier, coil and a capacitor.

The drawings, when arranged in the relation stated above, show a circuit arrangement wherein by the setting of three switches, i. e., hundreds, tens and units decade switches, H, T and U, respectively (Fig. 2), and the actuating of key P, an input three-digit number, can be set up and translated, by virtue of a jumper run through the coils, into an output three-digit number which is displayed on the bank of lamps shown in Fig. 2.

Each set of hundred terminals has allotted to it ten terminals strips, each strip containing ten terminals. The ten terminal strips allotted to the zero or first hundred, for example, are as designated in Fig. 1, TSA00, TSA01, TSA02, TSA03, TSA04, TSA05, TSA06, TSA07, TSA08 and TSA09.

In Fig. 1, five pairs of input terminal strips are shown as numbered in the above paragraph; that is, the complete number of terminal strips for the zero or first hundred, but it would take up too much space to show all the terminal strips for all the hundreds or even for the ninth or last hundred (Fig. 2) of the total 1000 terminals, so they are not all shown. Furthermore, it is not necessary to show them in order to understand the invention. It is only necessary to make a showing of the input and output strips of the zero hundreds, and a partial showing of the terminal strips associated with the ninth hundred, and the latter is done in Fig. 2. Consequently only two hundreds-block relays are shown, H–0 for the zero hundreds is shown in Fig. 1, and H–9, for the ninth hundreds is shown in Fig. 2.

It will be noted that the hundreds-block relays have ten armatures numbered 0 to 9. When relay H–0, for example, is operated by the actuation of switch P, it connects all the conductors leading from the terminals 0 to 9 of the tens decade switch T to the respective input terminal strips TSA01 to TSA09. All circuits are not closed at this time, however, but this operation prepares a circuit which is closed later to operate the translator as will appear. This latter circuit clossure will result in the illumination of the desired lamp circuits.

It is believed that the operation can now be readily understood.

*Description of operation*

It is assumed that jumpers have been previously run connecting the input terminals to the output terminals, each jumper running through such coils as to give the desired translation when it is selected.

According to an assumed input number, 090, the jumper 17 runs from terminal 090 on input terminal strip TSA09 through hundreds coil 8H, tens coil 8T, units coil 8U and to terminal 090 on output terminal strip TSB09. The output information or translation for input number 090 is, therefore, the number 888.

Assume also that the hundreds, tens and units switches H, T, and U, shown in Fig. 2, are set to such positions as to correspond to the three-digit number 090 whose translation is sought. These switches are positioned as shown, "H" on terminal 0, "T" on terminal 9 and "U" on terminal 0.

The translation is obtained by operating key P which connects ground to the wipers of hundreds switch H and units switch U, and connects +130 volts from battery 60 to lamp bank return multiple and other circuits to be described later. Positive battery 60 is connected permanently to the wiper of the tens switch T. The ground through switch H completes a circuit and thereby operates the zero hundreds-block relay H–0 over a path from: ground, through contact 10 of key P, conductor 11, wiper and terminal 0 of switch H, conductor 12, the winding of hundreds-block relay H–0 and to battery.

Another hundreds-block relay, H–9, is shown in Fig. 2 the winding of which is connected to contact No. 9 of hundreds switch H. However, the hundreds relay H–9 was not selected for this example and does not operate.

Ground through units switch (U) is applied to the one hundred rectifiers which are connected to the output terminals whose units digit is 0 over a path from ground through contact 13 of key (P), conductor 14, wiper and terminal 0 of the U switch, conductor 0, and to said rectifiers. It will be noted that for convenience all the conductors leading from the terminals of switch U, namely 15, are shown as a group, but it will, of course, be understood that ten separate and independent wires lead from the ten terminals of units switch U to the ten wires marked 0 to 9 connected respectively to the pairs of rectifiers connected to the output terminal strips at the right side of Figs. 1 and 2.

Relay H–0 operates and upon closing its contacts, causes a current to pass over a path from the 130-volt battery 60, back contact and armature of relay SR, wiper and terminal 9 of the T switch, conductor 16, through contact 9 of relay H–0, terminal 090 of input terminal strip TSA09, jumper conductor 17, terminal 090 of output terminal strip TSB09, rectifier 18, conductor 0, terminal 0 and wiper of switch U, conductor 14, contact 13 of key P, and to ground. A negative step of voltage is produced across resistance A the leading edge of which is transmitted through the coupling condenser Y to electrode E of tube K. At this time electrode E functions as a cathode the instantaneous voltage being approximately 130 volts negative with respect to grounded electrode D which at this time functions as a starter anode. Anode transfer then takes place from electrode D to the main anode F with E as a cathode and finally cathode transfer takes place and the arc is established between the main anode F and D as a cathode. Relay SR then operates over a path from +130-volt battery through preliminary contact on key P, the winding of relay SR, the arc of tube K between its electrodes F and D and to ground. When relay SR operates it closes a circuit from the output of the network consisting of condenser C, inductance L, resistance B, to jumper 17. The condenser discharges through inductance L producing an oscillatory current to flow over a path the output of the RLC network, across rectifier V, through resistance B, front contact of relay SR, through wiper and terminal 9 of switch T, and the jumper path as described previously. When this current is positive, rectifier V (Fig. 2) does not conduct and the current flows through the jumper inducing a voltage in the coils it passes through and thus the tubes associated with coils 8H, 8T and 8U operate, and in turn light the corresponding lamps. When the current is negative, the rectifier V bypasses the current to ground rather than through the B resistance and jumper, thus preventing a high reverse or back voltage from being impressed upon the rectifiers shown on Figs. No. 1 and No. 2 associated with the output terminals.

It will be observed that the tens switch T and the hundreds-block relay H–0 in operating choose a group of ten jumpers and that the units switch chooses a group of one hundred jumpers. Only the selected jumper is common to both groups. The purpose of the rectifier in series with each jumper is to confine the signal current to the selected jumper. To show how this is accomplished the case just described should be considered when jumper 17 (090) is selected as was described. Relay H–0 also selected jumper 18 (091), however, for example, as well as jumper 17. If the rectifiers were not present or were shorted out, the current from condenser C would not only flow in jumper 17 (090) and conductor 0, but in jumper 18 (091), conductor 1, the short around rectifier 071, through jumper 19 (071) to input terminal 071, input terminal 070 through jumper 20 (070) through rectifier 070, conductor 0 to ground at the units switch. However, with the rectifiers in the circuit the positive current cannot get through rectifier 071; consequently the circuit just described does not exist and the current is confined to jumper 17 connected to terminal 090. A similar condition holds for other unwanted terminals 092 to 099.

It might be stated at this point that the function of resistance X is to provide a means for limiting current in electrode E, and that the function of resistance Z is to keep the main anodes of the gas tube K at ground potential normally so that spurious charges cannot trigger the tube. The function of resistance R is to limit the charging current for capacitor C; and that the function of resistance B is to limit the discharge current of capacitor C and to provide a higher resistance for the path through the jumper than the forward resistance of rectifier V so that the negative current is safely diverted to ground.

It should be understood that while manually operated decade switches are shown for setting up an input three-digit number which is translated by this circuit arrangement into a different three-digit number which is displayed on lamp banks, automatic arrangements could be used to incorporate the translator into a system for line identification, number group translation or for other purposes where a translator is required, without departing from the spirit of this invention.

What is claimed is:

1. In combination, a plurality of magnetic rings, windings individual to said rings, a device responsive to the energization of each of said windings, a plurality of jumpers each threaded through a different combination of said rings to energize said windings when traversed by a changing electric current, a rectifier included in the circuit of each of said jumpers, means for selecting one of said jumpers comprising a plurality of contacts smaller in number than said plurality of jumpers and means whereby a source of changing current can be connected to a plurality of said jumpers, said jumper being activated to energize the windings of the rings through which it is threaded and consequently activating only predetermined ones of said responsive devices.

2. In combination, a plurality of magnetic rings, windings individual to each of said rings, devices responsive to the energization of said windings, jumpers each threaded through a different combination of said rings to energize said windings when traversed by a changing electric current, a rectifier included in the circuit of each of said jumpers, contact means in addition to said rectifiers including a hundreds, a tens and a units switch for selecting in accordance with an input number one of said jumpers, and means whereby a changing current can be connected to a group of said jumpers, to energize the windings of the rings through which the selected jumper is threaded and consequently activating only predetermined ones of said responsive devices, the number of contacts in said contact means being smaller than the number of said jumpers.

3. In combination, a plurality of magnetic rings, windings individual to each of said rings, devices responsive to the energization of said windings, jumper wires each threaded through a different combination of said rings to energize said windings when traversed by an oscillatory electric current, means including a rectifier in the circuit of each of said jumpers for selecting one of said jumpers, and control means whereby a current of an oscillatory nature can be connected to a plurality of said jumpers, so that only the selected jumper is activated due to the passage therethrough of the positive half wave and consequently only the responsive devices associated therewith are activated, said selecting means and said control means having together approximately only one contact for ten of said plurality of jumpers.

4. In combination, a plurality of magnetic rings, windings individual to said rings, devices responsive to the energization of said windings, jumpers each threaded through a different combination of said rings to energize said windings when traversed by a changing electric current, contact means for selecting a plurality of groups of jumpers, means for impressing a changing current on only the one jumper which is common to all of said groups comprising rectifiers, one for each jumper, whereby only predetermined ones of said responsive devices are activated, said contact means having relatively few contacts compared to the number of said jumpers.

5. An electronic induction translator comprising a plurality of selector switches; a plurality of relays controlled by one of said selector switches; said plurality of relays and said plurality of selector switches each having a plurality of contacts; a plurality of magnetic rings; and a plurality of jumpers selectively responsive to said plurality of selector switches threaded through different combinations of said rings, said plurality of jumpers being approximately ten times greater than the total number of contacts of said pluralities of selector switches and block relays.

6. An electronic induction translator comprising a plurality of magnetic rings; windings individual to said rings; a device responsive to the energization of each of said windings; a plurality of jumpers threaded through different combinations of said rings energizing said windings when traversed by a changing electric current; means for selecting one of said jumpers comprising a plurality of rectifiers one for each of said jumpers and a relatively small plurality of contacts one for approximately ten of said jumpers; and a source of changing current connectable to said jumpers causing the energization of one combination of said windings.

THOMAS L. DIMOND.

References Cited in the file of this patent

UNITED STATES PATENTS

| Number | Name | Date |
|---|---|---|
| 1,331,151 | Hopkins | Feb. 17, 1920 |
| 2,244,700 | Horton | June 10, 1941 |
| 2,510,061 | Branson et al. | June 6, 1950 |
| 2,577,609 | Dimond et al. | Dec. 4, 1951 |